United States Patent [19]

Balland

[11] 4,118,538

[45] Oct. 3, 1978

[54] FABRIC-PRINTING OR DYEING PROCESS USING THERMOSENSITIZER FOR LATEX BINDER

[75] Inventor: Jean Balland, Chateaurenault, France

[73] Assignee: Manufacture de Produits Chimiques Protex, Societe Anonyme, Paris, France

[21] Appl. No.: 818,676

[22] Filed: Jul. 25, 1977

[51] Int. Cl.$^2$ .................. C08L 7/02; C08G 51/24; C08G 51/66

[52] U.S. Cl. .................. 428/425; 427/390 R; 8/18 R; 8/85 R; 260/4 R; 260/29.6 MN; 260/29.6 NR; 260/29.6 ME; 260/29.6 RB; 260/29.7 N; 60/29.7 NR; 260/29.7 E

[58] Field of Search ............. 8/18 R, 85; 427/390 R; 260/4 R, 29.6 MN, 29.6 NR, 29.6 ME, 29.6 RB, 29.7 N, 29.7 NR, 29.7 E; 428/425

[56] References Cited

U.S. PATENT DOCUMENTS

| 3,326,628 | 6/1967 | Olaj et al. ............... 8/85 X |
| 3,860,548 | 1/1975 | Roccheggiani et al. ............... 8/85 X |
| 4,053,440 | 10/1977 | Bonnet et al. ............... 260/29.6 X |

FOREIGN PATENT DOCUMENTS 830,872   3/1960   United Kingdom .................. 8/85

*Primary Examiner*—Michael R. Lusignan
*Attorney, Agent, or Firm*—Karl F. Ross

[57] ABSTRACT

Textile fabrics are dyed with a substance comprising a pigment or colorant and a latex serving as a binding agent or color agglutinant which bonds the pigment to the fabric. The latex is rendered thermally sensitive and hence is thermally activatable by the introduction of an alkylene-oxide/urethane copolymer.

5 Claims, No Drawings

FABRIC-PRINTING OR DYEING PROCESS USING THERMOSENSITIZER FOR LATEX BINDER

CROSS-REFERENCE TO RELATED APPLICATION

The present application relates to application Ser. No. 601,042, filed Aug. 1, 1975, now U.S. Pat. No. 4,053,440, patented Oct. 11, 1977, which is copending herewith and commonly owned herewith.

FIELD OF THE INVENTION

The present invention relates to a process for the dyeing or printing of textile materials and, more particularly, to dyeing or printing processes in which all or part of the binder is in the form of a latex in which the pigment material or dyestuff is distributed.

BACKGROUND OF THE INVENTION

One of the advantages of pigment-dyeing textiles is the economy of the process. Thus there is also a saving of water and/or energy. Dyeing can be carried out by padding the textile fabric simply followed by a drying and a polymerization to ensure bonding of the pigment material to the fiber.

Processes of this type can be used for the coloration of fibers and mixtures of fibers of various types. The absence of any need for affinity between the pigment material and the fibers, permits the process to be used for the dyeing of the most varied mixtures of fibers with uniform totality and reproducability. In all cases, the bonding between the pigment material and the fibers is not a function of chemical affinity between the pigment material and the fibers, but rather a bonding effect brought about by a bonding agent which is applied together with the pigment as part of the dyeing composition. It is no longer necessary to wash the fabric extensively, a considerable economic saving over other dyeing processes.

The pigment used for the dyeing of textile fabrics according to earlier processes comprise, as essential ingredients, a colored pigment insoluble in water, and a binder capable of fixing the pigment to the fibrous support.

It is common practice to use as the binder, emulsions of polymers or copolymers, generally acrylate or alkylmethacrylate copolymers, styrene-acrylate and/or alkylmethacrylate copolymers, butadiene-acrylate, styrene-butadiene, and styrene-butadiene-acrylate copolymers, terpolymers, etc.

These diverse products are capable of providing a latex in which the coloring agent is dispersed and which can be used to bond the coloring agent to fibers which may have no affinity whatsoever to the coloring agent or pigment.

In the aforementioned copending application and in French application No. 74 27 662, there are described new compounds which can be added to synthetic-resin latexes and characterized by a thermal sensitivity, especially by their ability to cause coagulation and activation of the latex under predetermined conditions upon an increase in temperature. In other words, the aforedescribed application provides thermosensitive latex compositions which can be activated at predetermined temperatures.

Other thermally coagulatable latexes have also been described in the literature. In general, they are intended to serve as bonding agents for nonwoven fabrics and even for the formation of thin-wall or small-thickness molded bodies.

With respect to latexes which contain pigments, it has been found that conventional compositions permit migration of the pigment from the surface which is coated toward the opposite surface, usually with increasing temperature, giving rise to irregular coloration, poor cutting, the so-called double-face effect and like phenomena. Because of migration of pigments to the surface of the textile material, the finished article has a poor resistance to wear of the color applied.

OBJECTS OF THE INVENTION

It is an object of the present invention to provide an improved process for the pigment dyeing or printing of a textile material whereby the aforedescribed disadvantages are avoided and an effective bond of the pigment to the fabric which resists wear and is free from the other mentioned drawbacks, is obtained.

Another object of the invention is to extend the principles set forth in the above-identified application.

Still another object of this invention is to provide a process for the dyeing of a textile fiber in which migration of particles of the coloring pigment is minimized.

SUMMARY OF THE INVENTION

These objects and others which will become apparent hereinafter are attained, in accordance with the present invention, by using, in the printing agent, which includes the pigment, a nonionic or anionic thermosensitive latex whose coagulation is effected by raising the temperature to a predetermined level.

All or part of the latex can be constituted by a substance of the type described in the aforementioned copending application.

More specifically, the thermosensitive latex comprises, for 100 parts of the latex, 0.05 to 5 parts of an alkylurethane copolymer of the following formula:

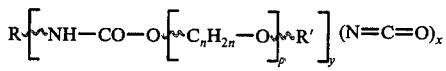

in which

R is an aliphatic group and/or an aromatic group which can contain biuret, urethane or isocyanate groups, R' is hydrogen, a lower alkyl group having 1 to 8 carbon atoms, an aryl group, usually phenyl, or an aralkyl group in which the alkyl moiety has 1 to 8 carbon atoms and the aryl is usually phenyl.

$x$ is between 0 and 1, $y$ is always greater than 2, $z$ is equal to the sum of $x$ and $y$ but is always greater than 2, $n$ having a value between 2 and 4, inclusive, and $p$ having a value at least equal to 5.

The latex which can be used in the thermosensitive system of the invention, comprises the synthetic polymeric latexes including the following:

homopolymers of conjugated olefins such as butadiene, methylbutadiene, isoprene and their homologs;

copolymers of such diolefins with vinylic and acrylic monomers copolymerizable therewith, including styrene, methylmethacrylate, vinylacetate, acrylonitrile, acrylic esters, acrylic acid, methacrylic acid, vinyl chloride, and vinylidene chloride;

copolymers of conjugated diolefins as listed above with isoolefins such as isobutylene;

ethylene homopolymers and copolymers, the copolymers being with vinylic and acrylic monomers as cited above or with olefins copolymerizable with ethylene such as propylene;

vinylic homopolymers and copolymers such as those of vinyl acetate, vinyl chloride;

the homopolymers and copolymers of acrylic esters such as those of methylacrylate, ethylacrylate, butylacrylate, methylmethacrylate, butylmethacrylate, acrylic acid, methacrylic acid, acrylomide, N-methylolacrylimide, glycilyl methacrylate;

vinylic-acrylic copolymers such as those of vinyl acetate with the acrylic esters mentioned above, the copolymers of vinyl chloride or vinylidine chloride with the acrylic esters mentioned above, the copolymers of styrene with the acrylic esters mentioned above.

Other homopolymers, copolymers and terpolymers containing the abovedescribed monomers are also applicable.

The proportion of the alkylene-urethane copolymer with respect to the quantity of the binder used can vary between 2 and 80% and is preferably between 5 and 30% by weight.

To the extent that other details of the alkylene-urethane copolymer of the formula:

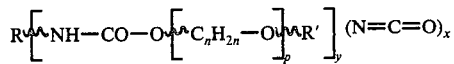

may be required, reference may be had to the aforementioned U.S. application or the corresponding French application likewise identified above.

The latexes can contain the usual additives or adjuvants necessary to promote vulcanization or reticulation of the polymer and additives to improve the stability of the latexes and the mechanical strength and chemical inertness of the resulting polymers. Thus in the textile industry one may employ ammonium salts (such as ammonium chloride, diammonium phosphate) to promote reticulation of acrylic polymers having reactive groups of the N-methylol type or the like. Such additives can be used with systems in accordance with the present invention without difficulty.

The natural or synthetic polymer latexes in accordance with the present invention should contain 25 to 75% by weight of dry solids and preferably 40 and 50% by weight dry solids.

The thermosensitive compositions according to the present invention are obtained by simply adding the urethane/alkylene oxide copolymer to the latex, utilizing a quantity of the copolymer necessary to obtain the desired coagulation temperature. This temperature can be controlled for any particular latex by the proportion of the urethane-alkylene copolymer which is added, although the coagulation temperature will generally lie in the range between 30° C. and 80° C. In general it is preferred to control the coagulation temperature so that it lies between 35° C. and 55° C. for best results with respect to storage of the bath and its use.

SPECIFIC EXAMPLES

EXAMPLE I

A woven cotton fabric previously hydrophylized and bleached is impregnated with the following composition:
5 g/l of a pigment dyestuff;
40 g/l of a binder;
20 g/l of a thermosensitizing agent.

The excess liquid from the aqueous impregnating bath is pressed out from between a pair of roller so that the fabric retains 80% of its original weight of the impregnating bath.

The fabric is subjected to a rapid predrying by passing it through a tunnel provided with infrared heating elements having a spectrum such that an emission maximum lies between 2.3 and 3.4 nanometers (wavelength), the drying time in the tunnel being 15 seconds.

The fabric is then subjected to finish drying at a temperature of 100° C. and it is then subjected to a thermal treatment in hot air for a period of 4 minutes at 150° C.

Dyestuff: commercial coloring pigment from BASF (Ludwigshafen, Germany) marketed as Blue Helizarine R.

Binding agent: thermally coagulatable aqueous emulsion containing 40% dry matter and constituted by ethylacrylate copolymerized with butylacrylate-methylacrylimide.

Thermosensitizing agent: aqueous solution containing 30% by weight of an alkylene-urethane copolymer obtained in accordance with Example 1 of the above-identified application and example "A" hereinbelow.

After treatment, a blue color is found to have bonded completely and effectively to the fabric. When the test was carried out in the absence of the thermosensitizing agent the product was found to be less vivid with an irregular surface indicative of significant migration.

EXAMPLE II

The process was the same as that of Example I with the following differences:
Fabric: polyester-viscose weave;
Colorant: 5 g/l of a commercial pigment marketed by BASF under the name Red Helizarine R;
Binding agent: aqueous emulsion containing 45% dry matter and consisting of a copolymer of ethylacrylate and acrylonitrile;
Thermosensitizing agent: same as in Example I.

After treatment, the fabric was found to have a red coloration of excellent intensity without any indication of migration and found to be firmly bonded upon repeated washing. The wearability of the color above that of a sample produced without the thermosensitizing agent was marked.

EXAMPLE III

The conditions were identical to those of Example I. After passage of the fabric through the infrared predrying tunnel, the fabric was dried at 100° C. after having been previously folded in two so as to make the drying conditions particularly severe and increase the possibility of migration. After treatment, upon opening of the fabric, the two surfaces were found to be absolutely identical, thereby demonstrating the total absence of migration. The same test was carried out without the thermosensitizing agent and showed, upon opening of the fabric, an internal region of low coloration, the color having migrated toward the opposite face.

EXAMPLE IV

Cotton fabric is impregnated in a bath having the following composition:

5 g/l of a pigment dyestuff;
30 g/l of a binding agent;
15 g/l of a thermosensitizing agent.

Pigment dyestuffs: aqueous dispersions of commercial pigments marketed by BASF under the name Helizarine.

Binding agent: aqueous emulsion containing 45% dry weight of a butydiene-acrylonitrile copolymer.

Thermosensitizing agent: aqueous solution of 30% of a polysiloxane commercially modified by BAYER (Germany) and marketed under the name of Coagulant WS.

After impregnation in the manner described in Example III, the fabric was previously folded and dried at 100° C.

After treatment, it was found that the sample showed no migration.

EXAMPLE V

The conditions were identical to those of Example III but the thermosensitizing agent was a solution of 5 g/l of an alkylene-urethane copolymer corresponding to that described in Example III (Example C below) of the above-identified copending application. After treatment and handling in the manner described in Example IV, the fabric was found to be far more effectively and permanently bonded to the fabric than in the sample of Example IV but was also free from migration and irregularity.

EXAMPLE VI

The conditions were identical to those of Example I except that in place of the 40 g of the binding agent, 25 g/l of a binding agent of a nonthermocoagulatable type was used in the form of an aqueous emulsion containing 40% by weight of an ethylacrylate copolymer with acrylonitrile and 15 g/l of the thermocoagulatable binding agent used in Example I.

After treatment the sample showed no indication of migration.

A sample prepared under the same conditions with 40 g/l of the nonthermocoagulatable emulsion, namely without the thermocoagulatable latex, has a less vivid color and was irregular.

The thermosensitizing agent made as described below were useful in each of the foregoing examples:

EXAMPLE A

In a 2-liter flask provided with an agitator, a thermometer and a reflux condenser, 500 grams of toluene and 100 grams of the monobutylic ether of a copolymer of ethylene glycol and propylene glycol (in the proportion 50/50 by weight) of a molecular weight of about 10,000, are processed. Traces of water are first eliminated by azeotropic distillation of the water-toluene and then 2.5 grams of the polyisocyanate of phenylene polyisocyanate (commercially marketed under the designation PAPI) prior to the reaction. The mixture is heated at 100° to 100° C. for a period of three hours whereupon the toluene is eliminated by distillation in vacuo at 170° C. and 40 mm of mercury. The thermosensitive product (A) thus obtained is a clear yellow oil of high viscosity, soluble in cold water, having a cloud point of 44° C.

EXAMPLE B

The method of Example I is followed utilizing an excess of phenylene polyisocyanate with respect to the butylic monoether of polyethylene/polypropylene glycol (50/50 by weight).

The product (B) thus obtained, which contains isocyanate groups in a free or reactive state, can then be reacted with water and is a brownish clear oil of high viscosity, soluble in cold water and having a cloud point of 38° C.

EXAMPLE C

Into a 2-liter flask provided with an agitator, a thermometer and a reflux condenser, there are introduced 500 grams of toluene and 100 grams of the butylic-monoether of polyethylene glycolpolypropylene glycol of molecular weight of the order of 8000, the ethyleneglycol and the propyleneglycol being present in a proportion of 50/50 by weight.

After elimination of water by azeotropic distillation, 3.5 grams of a solution of 75% concentration of a polyisocyanate obtained by condensation of hexymethylene diisocyanate with water, is introduced. This polyisocyanate is commercially marketed under the name DESMODUR N. The mixture is refluxed for 2 hours and the solvent is eliminated by distillation at 170° C. under a vacuum of 40 mm of mercury. An oily thermosensitizing product (C) of yellowish clear color is obtained. The product C is soluble in cold water and has a cloud point of 44° C.

| Concentration of (C) % | 0.05 | 0.1 | 0.2 | 0.5 | 1 |
| --- | --- | --- | --- | --- | --- |
| Coagulation temperature | 46° C | 43° C | 41° C | 37° C | 34° C |

EXAMPLE D

Into a 2-liter flask provided with an agitator, thermometer and a reflux condenser, 500 grams of toluene and 100 grams of the butylicmonoether of polyethylene glycol/polypropylene glycol (50/50 by weight) with a molecular weight of 10,000 are introduced. After the water has been eliminated by azeotropic distillation, 5.7 grams of a 75% solution of a polyisocyanate obtained by the condensation of toluene diisocyanate with trimethylolpropane, in ethylacetate, is introduced. The polyisocyanate is commercially available under the name DESMODUR L. The mixture is refluxed for three hours and the toluene is then removed by vacuum distillation at 40 mm mercury and 170° C. The thermosensitizing product (D) thus obtained is very viscous yellow oil soluble in cold water and having a cloud point of 42° C.

EXAMPLE E

Into a 2-liter flask provided with an agitator, a thermometer and reflux condenser, there are introduced 500 mm of toluene, 70 grams of butylicmonoether of polyethylene/polypropylene glycol (proportion 50/50 by weight) with a molecular weight of 10,000, and grams of the nonylphenolether of polyethylene glycol having a molecular weight of 1524. After elimination of traces of water by azeotropic distillation, 7.2 grams of a solution commercially available under the name DE- SMODUR N is introduced. This solution has a concentration of 75% by weight of a mixture of ethylglycolacetate and xylenepolyisocyanate.

The reaction mixture is refluxed for three hours, the solvents being eliminated by distillation at 170° C. under a vacuum of 40 mm of mercury. The thermosensitizing product (E) thus obtained is white, highly viscous, soluble in water (cold) and has a cloud point of 41° C.

EXAMPLE F

The preceding Example is repeated with a mixture of 70 grams of the monobutylether of polyethylene-polypropylene glycol (proportion 50/50 by weight) with a molecular weight of 10,000 and 30 grams of a copolymer sequence: polyethylene-polypropylene glycol commercially marketed under the name PLURONIC of a molecular weight of 1830, and 9.5 grams of the polyisocyanate of Example E. The thermosensitizing product (F) is obtained which is highly viscous, white, soluble in cold water and having a cloud point of 45° C.

I claim:

1. A process for the coloring of textiles which comprises the step of:

treating the textile with a pigment dyestuff in a binding agent in the form of a latex and including a thermosensitizing agent constituted by an alkylene-urethane copolymer, the proportion of the alkylene-urethane copolymer with respect to the quantity of latex being between 2 and 80% by weight; and heating the treated textile to a temperature sufficient to activate said latex and bond said pigmentary colorant to said fabric.

2. The process defined in claim 1 wherein said alkylene-urethane copolymer has the formula:

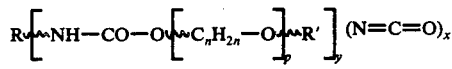

in which

R is an aliphatic and/or aromatic group which can be substituted with a biuret, urethane or isocyanate group, R' is selected from the group which consists of hydrogen, lower alkyl having 1 to 8 carbon atoms of straight or branch chain, aryl or alkylaryl, $x$ is between 0 to 1, $y$ is always greater than 2, $z$ equals $x + y$ and is always greater than 2, $n$ ranges from 2 to 4, inclusively, and $p$ has a value at least equal to 5.

3. The process defined in claim 2 wherein said proportion ranges between 5 and 30% by weight.

4. The process defined in claim 3 wherein the fabric, after being contacted with the composition containing said colorant, said latex and said thermosensitizing agent is subjected to radiant heating to induce the coagulation of the thermosensitive latex and prevent migration of the pigment, the textile being thereafter dried.

5. Textile articles made by the process defined in claim 1.

* * * * *